United States Patent [19]
Lee et al.

[11] Patent Number: 5,961,215
[45] Date of Patent: Oct. 5, 1999

[54] TEMPERATURE SENSOR INTEGRAL WITH MICROPROCESSOR AND METHODS OF USING SAME

[75] Inventors: Thomas H. Lee, Cupertino; Mark G. Johnson, Los Altos; Matthew P. Crowley, San Jose, all of Calif.

[73] Assignee: Advanced Micro Devices, Inc., Sunnyvale, Calif.

[21] Appl. No.: 08/938,392

[22] Filed: Sep. 26, 1997

[51] Int. Cl.$^6$ ........................................... G01K 7/01
[52] U.S. Cl. .................................................. 374/178
[58] Field of Search .................................. 374/141, 170, 374/172, 176, 178; 257/467, 470

[56] References Cited

U.S. PATENT DOCUMENTS

| | | | |
|---|---|---|---|
| 3,851,528 | 12/1974 | Nichols et al. | 374/178 |
| 4,165,642 | 8/1979 | Lipp | 374/178 |
| 4,277,975 | 7/1981 | Pinkham | 374/170 |
| 4,875,783 | 10/1989 | Swanson | 374/178 |
| 4,918,505 | 4/1990 | Blouke et al. | 357/24 |
| 4,943,559 | 7/1990 | Severin et al. | 374/176 |
| 5,024,535 | 6/1991 | Winston, Jr. | 374/178 |
| 5,159,520 | 10/1992 | Toyooka et al. | 257/470 |
| 5,295,746 | 3/1994 | Friauf et al. | 374/170 |
| 5,419,637 | 5/1995 | Frye et al. | 374/178 |
| 5,639,163 | 6/1997 | Davidson et al. | 374/178 |
| 5,655,305 | 8/1997 | Fletcher | 374/170 |

OTHER PUBLICATIONS

P. Gray, R. Meyer, *Analysis and Design of Analog Integrated Circuits*, 3rd Ed., pp. 338–346 (1993).

B. Song, P. Gray, "A Precision Curvature–Compensated CMOS Bandgap Reference", *IEEE Journal of Solid–State Circuits*, vol. SC–18, No. 6, pp. 634–643 (Dec., 1983).

*Primary Examiner*—G. Bradley Bennett
*Attorney, Agent, or Firm*—Skjerven, Morrill, MacPherson, Franklin & Friel, LLP

[57] ABSTRACT

A temperature sensor includes a bandgap reference circuit for providing a temperature-independent reference voltage, a biasing circuit that mirrors a current in the bandgap reference circuit for providing a temperature-dependent biasing voltage, and an amplifier responsive to the reference voltage and the biasing voltage for providing a temperature-dependent output voltage. Preferably, the temperature sensor is integral with a microprocessor and implemented in CMOS technology. The temperature sensor can be used, for instance, to reduce the clock speed of the microprocessor when the microprocessor temperature exceeds a predetermined temperature, or to store temperature-indicating data in non-volatile memory of the microprocessor to provide a thermal history of the microprocessor.

52 Claims, 10 Drawing Sheets

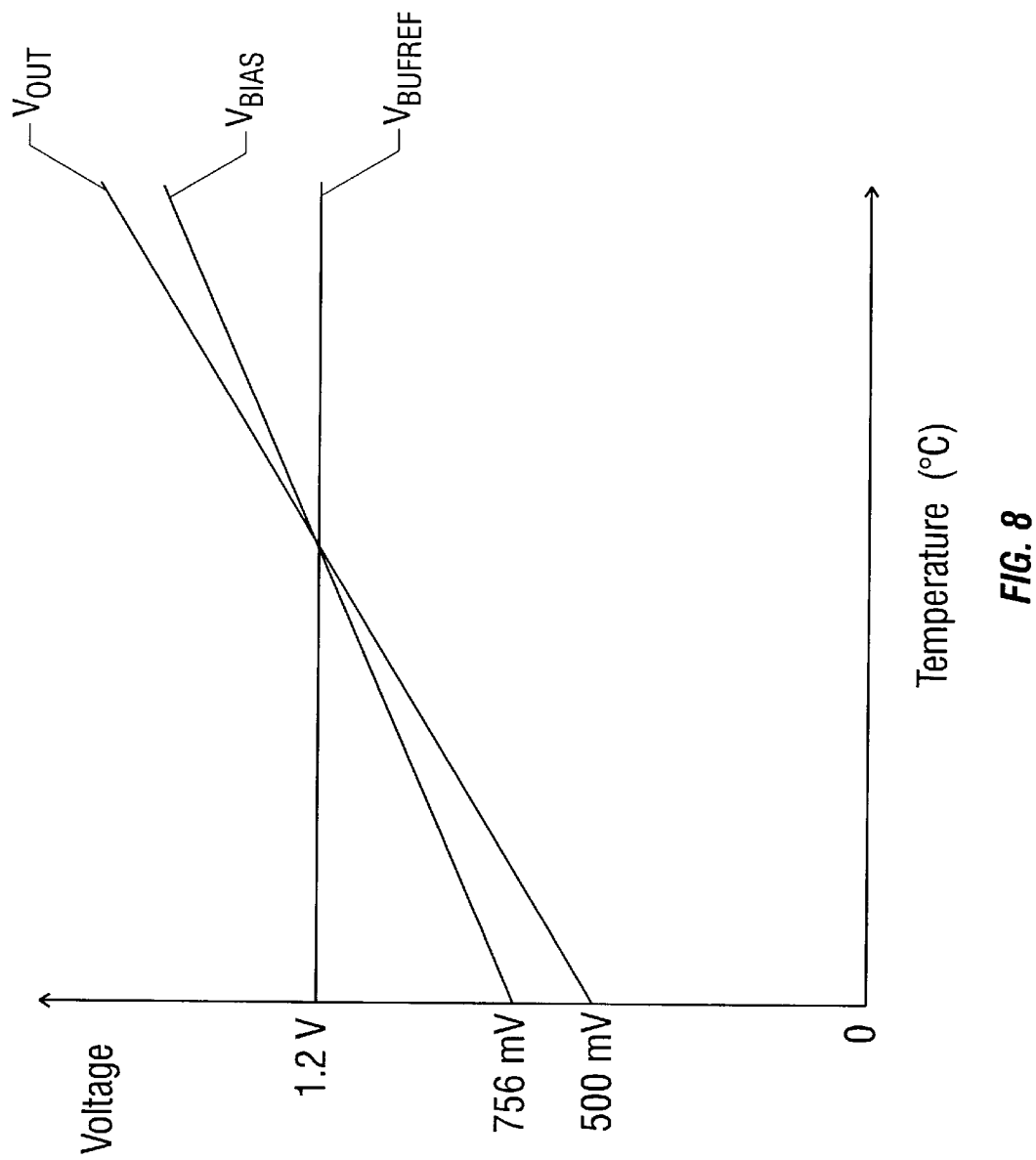

TEMPERATURE SENSOR INTEGRAL WITH MICROPROCESSOR AND METHODS OF USING SAME

BACKGROUND OF THE INVENTION

1. Field of the Invention

The present invention relates to electronic circuits, and more particularly to temperature sensors for producing temperature-dependent electronic signals.

2. Description of Related Art

Temperature sensors such as digital thermometers often measure temperature by exploiting the thermal-voltage characteristics of a diode. The temperature coefficient of a diode is the voltage drop across the diode as a finction of temperature while the diode is forward-biased by a constant current. The temperature coefficient of a diode tends to be a constant that decreases as temperature increases. A typical temperature coefficient is about −2 mV/° C. Furthermore, the voltage drop across a diode at absolute zero tends to be the bandgap voltage of the diode material, which is reliable and traceable to fundamental physical concepts. The bandgap voltage for silicon is about 1.2V. Therefore, the temperature of a diode can be accurately determined by measuring the voltage drop across the diode once the temperature coefficient is known.

Temperature sensors normally generate an output signal that increases with increasing temperature. Therefore, the voltage drop across a diode does not provide a suitable output signal since it decreases with increasing temperature.

A temperature sensor that is known in the art generates voltage drops of two diodes with different current densities. This can be accomplished by applying the same current to different sized diodes, or by applying different currents to identically sized diodes. In either case, the diode with the higher current density exhibits a smaller temperature coefficient (with a smaller absolute value) than the other diode. The diodes, however, have the same voltage drop at absolute zero, namely the band gap voltage of the diode material. Therefore, as temperature increases, the difference between the voltage drops of the diodes linearly increases. The temperature sensor also includes a differential amplifier that receives the voltage drops of the diodes and generates an output signal representing the difference between the voltage drops. The output signal linearly increases as temperature increases. In addition, the output signal is offset and amplified to indicate the temperature as degrees Celsius or Fahrenheit.

Temperature sensors are used in a variety of applications. For instance, a temperature sensor has been used to turn off a microprocessor when the temperature sensor determines that a predetermined temperature is exceeded in order to prevent data errors or reliability problems.

Microprocessors are usually implemented in CMOS technology because of its low DC power dissipation, high noise margin, wide temperature and voltage ranges, overall circuit simplification, layout ease, and high packing density. Temperature sensors, on the other hand, are typically implemented in bipolar technology using diode-connected bipolar transistors to provide the temperature coefficient as base-emitter voltage ($V_{BE}$) as a function of temperature. Although BiCMOS technology makes the integration of CMOS and bipolar technologies feasible, the tradeoff between process complexity and device quality may be unacceptable for microprocessors. As a result, typically the temperature sensor and the microprocessor are manufactured as separate integrated circuit chips, implemented in separate technologies, and the temperature sensor is placed about 1–2 inches from the microprocessor due to packaging constraints.

A major drawback of this approach is that the temperature sensor senses the temperature of itself, not the microprocessor. The temperature of the temperature sensor is affected by the ambient and/or other nearby circuits besides the microprocessor. Consequently, the temperature sensor senses a temperature that is only loosely correlated with the microprocessor temperature. Another drawback is the cost associated with multiple integrated circuit chips.

Accordingly, a need exists for an improved temperature sensor that senses a microprocessor temperature more accurately and cost-effectively than conventional approaches.

SUMMARY OF THE INVENTION

The present invention provides a temperature sensor that is integral with a microprocessor. That is, the temperature sensor and the microprocessor are embedded in a single integrated circuit chip. As a result, the temperature sensor accurately senses the microprocessor temperature. Furthermore, the temperature sensor is highly cost-effective since a separate integrated circuit chip is unnecessary.

In accordance with one aspect of the invention, a temperature sensor includes a bandgap reference circuit for providing a temperature-independent reference voltage, a biasing circuit that mirrors a current in the bandgap reference circuit for providing a temperature-dependent biasing voltage, and an amplifier responsive to the reference voltage and the biasing voltage for providing a temperature-dependent output voltage.

Preferably, the temperature sensor is implemented in CMOS technology. It is also preferred that a unity-gain buffer provides a buffered reference voltage in response to the reference voltage, and that the amplifier provides the output voltage in response to the buffered reference voltage and the biasing voltage.

The temperature sensor can be used, for instance, to reduce the clock speed of the microprocessor when the microprocessor temperature exceeds a predetermined temperature, or to store temperature-indicating data in non-volatile memory of the microprocessor to record a thermal history of the microprocessor.

These and other objects, features and advantages of the invention will be further described and more readily apparent from a review of the detailed description of the preferred embodiments which follows.

BRIEF DESCRIPTION OF THE DRAWINGS

FIGS. 4, 5, 6, 7 and 8 are graphs of voltage versus temperature at various nodes in the temperature sensor of FIG. 1;

DETAILED DESCRIPTION OF THE PREFERRED EMBODIMENTS

Figure 1:
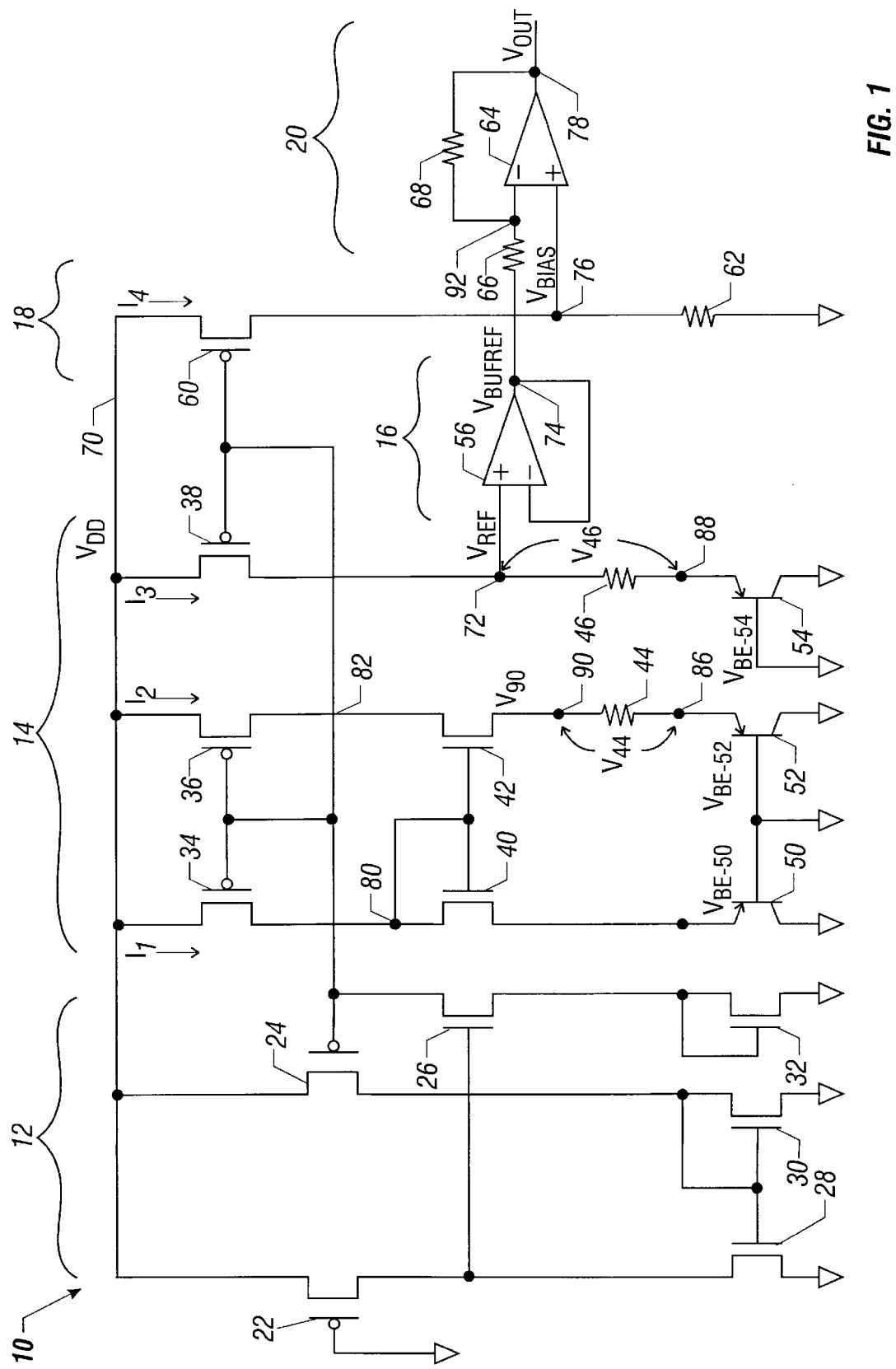
FIG. 1 is a circuit diagram of a temperature sensor in accordance with an embodiment of the present invention.

FIG. 1 is a circuit diagram of temperature sensor 10 in accordance with an embodiment of the present invention. Temperature sensor 10 includes start-up circuit 12, bandgap reference circuit 14, buffer 16, biasing circuit 18, and amplifier 20. Start-up circuit 12 includes P-channel MOS field effect transistors 22 and 24, and N-channel MOS field effect transistors 26, 28, 30 and 32. Bandgap reference circuit 14 includes P-channel MOS transistors 34, 36 and 38, N-channel MOS transistors 40 and 42, resistors 44 and 46, and diode-connected PNP bipolar transistors 50, 52 and 54. Buffer 16 includes operational amplifier 56. Biasing circuit 18 includes P-channel MOS field effect transistor 60 and resistor 62. Amplifier 20 includes operational amplifier 64 and resistors 66 and 68. Power supply terminal 70 provides a constant supply voltage ($V_{DD}$), such as 3.3 volts.

In addition, operational amplifiers 56 and 64 have supply terminals coupled to power supply terminal 70 and ground, the wells of the P-channel transistors are coupled to power supply terminal 70, and the wells of the N-channel transistors are coupled to ground. For convenience of illustration, these connections are not shown.

Start-up circuit 12 assures that bandgap reference circuit 14 assumes a normal current stable operating point when power is applied. Bandgap reference circuit 14 provides a temperature-independent reference voltage ($V_{REF}$) at node 72. Buffer 16 provides a temperature-independent buffered reference voltage ($V_{BUFREF}$) at node 74 in response to the reference voltage. Biasing circuit 18 provides a temperature-dependent biasing voltage ($V_{BIAS}$) at node 76, and amplifier 20 provides a temperature-dependent output voltage ($V_{OUT}$) at node 78 in response to the buffered reference voltage and the biasing voltage.

The biasing voltage is proportional to absolute temperature, and linearly increases as temperature increases. Thus, the biasing voltage provides the basic thermometer function However, the biasing voltage does not have the proper offset or slope to indicate temperature as degrees Celsius or Fahrenheit. To remedy this deficiency, buffer 16 translates the reference voltage into the buffered reference voltage at a low impedance output, and amplifier 20 amplifies the buffered reference voltage and the biasing voltage to provide the output voltage with the desired offset and slope.

Bandgap reference circuit 14 includes three current paths between power supply terminal 70 and ground. The first current path includes transistors 34, 40 and 50, the second current path includes transistors 36, 42 and 52 and resistor 44, and the third current path includes transistors 38 and 54 and resistor 46. Likewise, biasing circuit 18 includes a fourth current path between power supply terminal 70 and ground, that includes transistor 60 and resistor 62. Accordingly, a first current ($I_1$), second current ($I_2$), third current ($I_3$) and fourth current ($I_4$) flow through the first, second, third and fourth current paths, respectively. Furthermore, the gates of transistors 34, 36, 38 and 60 are coupled to the drain of transistor 36. Therefore, transistors 34, 36, 38 and 60 form a current mirror, and transistors 34, 38 and 60 mirror the second current through transistor 36.

Bandgap reference circuit 14 has two stable operating points. In the zero current stable operating point, transistors 34, 36, 38, 40 and 42 are turned off, no current (other than leakage current) flows through the first, second or third current paths, and temperature sensor 10 is inoperative. However, in the normal current stable operating point, transistors 34, 36, 38, 40 and 42 are turned on, and the first, second and third currents flow through their respective current paths, and temperature sensor 10 is operational. As is seen, the gates of transistors 40 and 42 are coupled to node 80, and the gates of transistors 34,36 and 38 are coupled to node 82. During power-up, in the absence of start-up circuit 12, the voltages at nodes 80 and 82 are indeterminate. If the voltage at node 80 is low enough to turn off transistors 40 and 42, and the voltage at node 82 is high enough to turn off transistors 34, 36 and 38, then bandgap reference circuit 14 assumes the zero current stable operating point. If, on the other hand, the voltage at node 80 is high enough to turn on transistors 40 and 42, then transistor 42 will pull node 82 to a low enough voltage to turn on transistors 34, 36 and 38, and bandgap reference circuit 14 assumes the normal current stable operating point. Likewise, if the voltage at node 82 is low enough to turn on transistors 34, 36 and 38, then transistor 34 will pull node 80 to a high enough voltage to turn on transistors 40 and 42, and bandgap reference circuit 14 assumes the normal current stable operating point.

Start-up circuit 12 remedies this uncertainty. As the power supply voltage ramps up, transistor 22 turns on when the power supply voltage exceeds its threshold voltage ($V_{TP}$) and effectively couples the power supply voltage to the gate of transistor 26. As the power supply voltage continues to ramp up, transistors 26 and 32 turn on when the power supply voltage exceeds their combined threshold voltages ($2V_{TN}$). Turning on transistors 26 and 32 pulls node 82 to threshold voltage $V_{TN}$, thereby S turning on transistors 34,36 and 38, which causes transistors 40 and 42 to turn on and initiates current flow through bandgap reference circuit 14. However, for bandgap reference circuit 14 to assume the normal current stable operating point, transistors 26 and 32 must stop diverting current from node 82. This will occur since pulling node 82 to threshold voltage $V_{TN}$ also turns on transistor 24, which causes transistors 28 and 30 to turn on. Turning on transistor 28 turns off transistor 26, thereby preventing start-up circuit 12 from diverting current from node 82. Since bandgap reference circuit 14 now assumes the normal current stable operating point, transistor 24 mirrors the current through the second current path, transistors 28 and 30 remain turned on, and transistor 26 remains turned off.

Returning to bandgap reference circuit 14, during operation (in the normal current stable operating point), transistors 34,36,38,40 and 42 are driven into saturation. In addition, transistors 15 34, 36,38,40 and 42 are matched in size. Therefore, transistors 40 and 42 (being N-channel devices) have larger drive currents than transistors 34 and 36 (being P-channel devices) due to the greater mobility of electrons than holes. As such, the first and second currents are determined primarily by transistors 34 and 36, respectively, since transistors 40 and 42 can not drive more current than transistors 34 and 36 supply. Accordingly, the first and third currents ($I_1$ and $I_3$) mirror the second current ($I_2$), and the first, second and third currents are essentially identical to one another.

The voltages at nodes 84 and 90 are inversely proportional to absolute temperature due to the temperature coefficients of transistors 50 and 52, respectively. This, in turn, causes the voltages at nodes 80 and 82 to be inversely proportional to absolute temperature. Since the voltage at node 80 is applied to the gates of transistors 40 and 42, and the voltage at node 82 is applied to the gates of transistors 34 and 36, the voltage at node 82 has a far larger affect on the first and second currents than the voltage at node 80. Accordingly, as the temperature increases and the voltage at node 82 decreases, transistors 34 and 36 supply more current and the first and second currents increase. Likewise, as the temperature decreases and the voltage at node 82 increases, transistors 34 and 36 supply less current and the first and second currents decrease. For this reason, the first and second (and third and fourth) currents are proportional to absolute temperature.

Transistors 52 and 54 are each eight times the size of transistor 50. Although transistors 52 and 54 can each be fabricated with a single emitter, base and collector region, it is preferred that transistors 52 and 54 each include eight parallel-connected transistors with the same size as transistor 50 in order to provide better matching.

Figure 2:
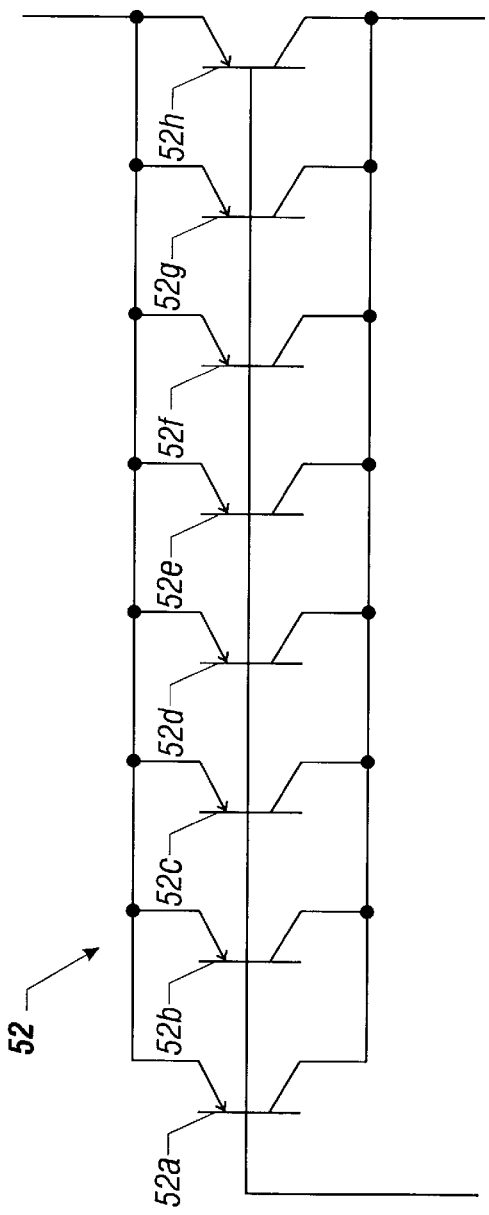
FIGS. 2 and 3 are circuit diagrams of diode-connected bipolar transistors in the temperature sensor of FIG. 1.
Figure 3:
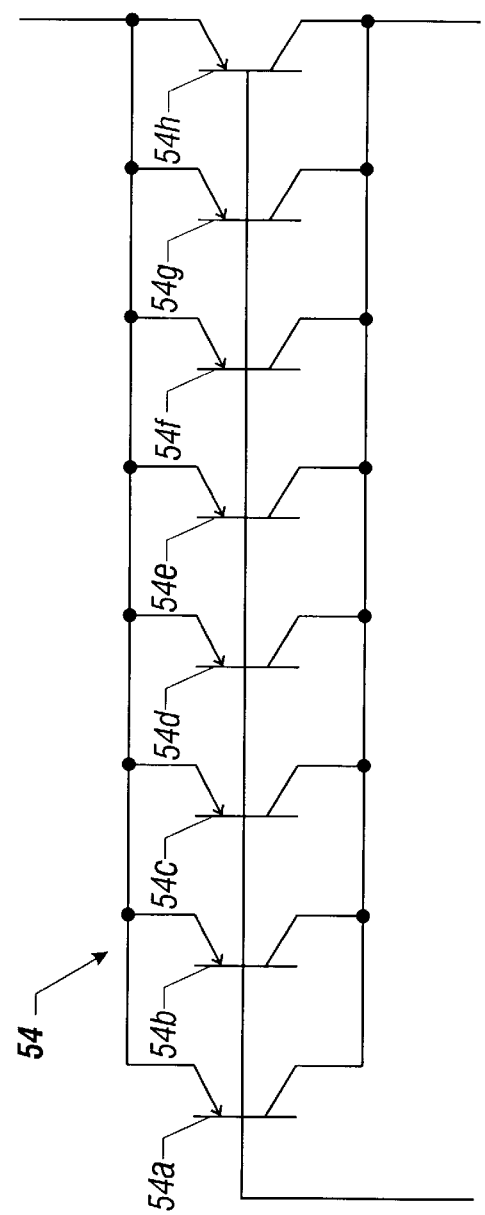

FIGS. 2 and 3 show circuit diagrams of transistors 52 and 54, respectively. As is seen, transistor 52 includes eight parallel-connected transistors 52a, 52b, 52c, 52d, 52e, 52f, 52g and 52h, and transistor 54 includes eight parallel-connected transistor 54a, 54b, 54c, 54d, 54e, 54f, 54g and 54h.

Returning to FIG. 1, since the first and second currents are essentially identical, and transistor 52 is eight times the size of transistor 50, the current density in transistor 50 is eight times the current density in transistor 52. As mentioned above, the temperature coefficient of a diode increases (has a greater absolute magnitude) as the current density decreases. Therefore, as temperature increases, the base-emitter voltage of transistor 52 ($V_{BE-52}$) decreases more rapidly than the base-emitter voltage of transistor 50 ($V_{BE-50}$). However, the voltages at nodes 84 and 90 are essentially identical to one another. That is, the base-emitter voltage of transistor 50 is essentially identical to the voltage drop across resistor 44 ($V_{44}$) plus the base-emitter voltage of transistor 52. Therefore, since the difference between the base-emitter voltages of transistors 50 and 52 increases as temperature increases, the voltage drop across resistor 44 also increases as temperature increases. The voltage drop across resistor 44 increases as temperature increases not only because the second current increases as temperature increases, but also because resistor 44 has a positive temperature coefficient.

Figure 5:
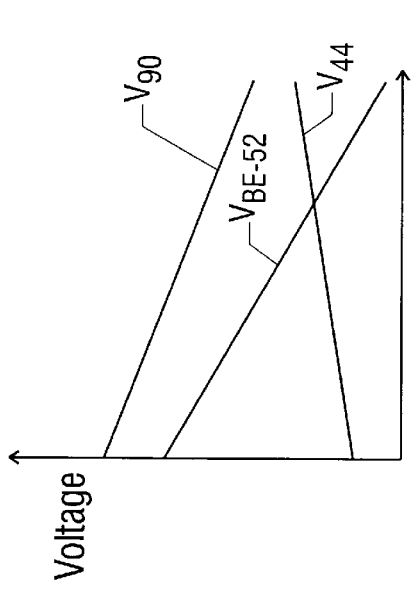
Figure 4:
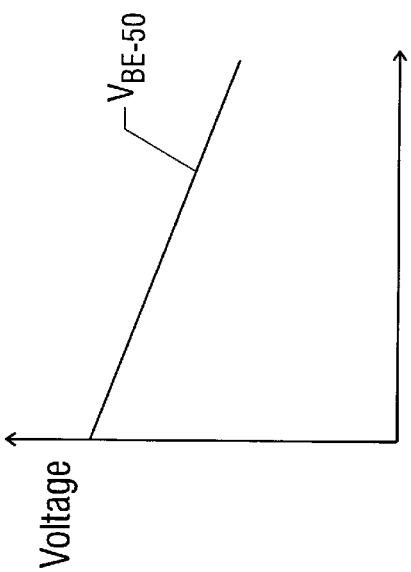

FIGS. 4 and 5 are graphs of the voltage at nodes 84 and 90, respectively, as a function of temperature. In FIG. 4, the voltage at node 84 is the base-emitter voltage of transistor 50 ($V_{BE-50}$), which decreases with increasing temperature. In FIG. 5, the voltage at node 90 ($V_{90}$) is a combination of the base-emitter voltage of transistor 52 ($V_{BE-52}$) and the voltage drop across resistor 44 ($V_{44}$). Although the temperature coefficient of transistor 52 has a steeper slope than the temperature coefficient of transistor 50, the voltage drop across resistor 44 offsets this difference. As a result, the voltages at node 84 and 90 are essentially identical to one another over a wide range of temperatures.

FIGS. 4 and 5 can be better appreciated in conjunction with the underlying device physics. For bipolar transistors, the base-emitter voltage ($V_{BE}$) is given by the expression $$V_{BE}=V_T ln(I_V/I_S) \quad (1)$$

where $V_T$ is the thermal voltage, $I_C$ is the collector current, and $I_S$ is the saturation current. The thermal voltage is given by the expression $$V_T=kT/q \quad (2)$$

where T is the absolute temperature in degrees Kelvin, k is Boltzmann constant, and q is the elementary charge. The collector current is given by the expression $$I_C=I_E(\beta/\beta+1) \quad (3)$$

where $I_E$ is the emitter current and P is the current gain which depends on minority-carrier lifetime in the base. Finally, the saturation current can be related to the device structure by the expression $$I_S qAn_i^2\overline{D}_n/Q_B \quad (4)$$

where q is the elementary charge, A is the emitter-base junction area, $n_i$ is the intrinsic minority-carrier concentration, $\overline{D}_n$ is the average effective value of the electron diffusion constant in the base, and $Q_B$ is the total base doping per unit area.

Since the voltages at nodes 84 and 90 are essentially identical, they can be related to one another by the expression $$V_{B-50}=V_{44}+V_{BE-52} \quad (5)$$

Assuming β is significantly greater than one (or negligible base currents), in accordance with expression (3), the collector current can be approximated by the emitter current. Therefore, the collector current for transistor 50 can be approximated by the first current ($I_1$), and the collector current for transistor 52 can be approximated by the second current ($I_2$). Furthermore, since saturation current is proportional to device area, and transistor 52 is eight times the size of transistor 50, the saturation current for transistor 52 is eight times the saturation current for transistor 50. Therefore, in accordance with expressions (1) and (5), $$V_T ln(I_1/I_S)=V_{44}+V_T ln(I_2/8I_S) \quad (6)$$

$$V_{44}=V_T ln(I_1/I_S)-V_T ln(I_2/8I_S) \quad (7)$$

$$V_{44}=V_T ln(8) \quad (8)$$

$$V_{44}=2.08kT/q \quad (9)$$

Accordingly, resistor 44 is selected so that its voltage drop satisfies expression (9) at a given temperature as the second current is applied.

The reference voltage at node 72 is independent of temperature (although it is understood that the reference voltage may exhibit negligible variations as the temperature changes). Since the second and third currents ($I_2$ and $I_3$) are essentially identical, and transistors 52 and 54 are essentially identical, the base-emitter voltages of transistors 52 and 54 at nodes 86 and 88, respectively, are essentially identical. As temperature increases, the base-emitter voltage of transistor 54 ($V_{BE-54}$) decreases. Therefore, in order to render the reference voltage independent of temperature, changes in the voltage drop across resistor 46 offset and effectively cancel changes in the base-emitter voltage of transistor 54 as temperature changes. For illustration purposes, the reference voltage is about 1.2V and corresponds to the bandgap voltage of silicon.

Figure 6:
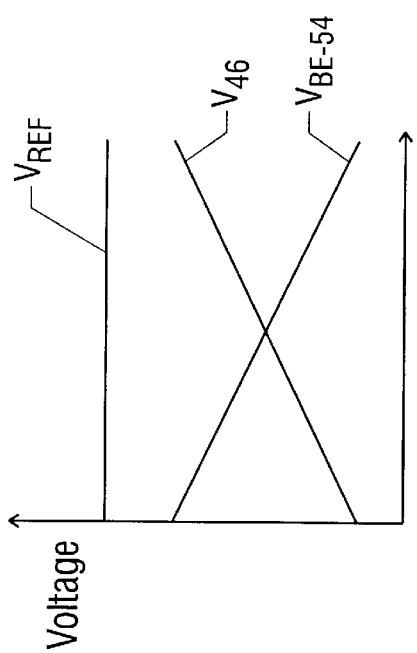

FIG. 6 is a graph of the reference voltage at node 72 as a function of temperature. The reference voltage ($V_{REF}$) is a combination of the base-emitter voltage of transistor 54 ($V_{BE-4}$) and the voltage drop across resistor 46 ($V_{46}$). Although temperature coefficient of transistor 54 has a negative slope, the voltage drop across resistor 46 has a positive slope. Accordingly, changes in the base-emitter voltage of transistor 54 and the voltage drop across resistor 46 offset one another and the reference voltage remains constant as temperature changes.

FIG. 6 can be better appreciated in conjunction with the underlying device physics. The reference voltage is given by the expression $$V_{REF}=V_{46}+V_{BE-54} \qquad (10)$$

As mentioned above, the base-emitter voltages of transistors 52 and 54 are interchangeable. In addition, if resistor 44 has resistance $R_{44}$, and resistor 46 has resistance $R_{46}$, then the voltage drop across resistor 46 is given by the ratio $(R_{46}/R_{44})$ times the voltage drop across resistor 44. Therefore, in accordance with expressions (1), (2), (3), (9) and (10), $$V_{REF}=V_{44}(R_{46}/R_{44})+V_{BE-54} \qquad (11)$$

$$V_{REF}=2.08(kT/q)(R_{46}/R_{44})+V_{BE-54} \qquad (12)$$

$$V_{REF}=2.08(kT/q)(R_{46}/R_{44})+(kT/q)ln(I_2/8I_S) \qquad (13)$$

The reference voltage is about 1.2V. Therefore, in accordance with expression (13), $$1.2=2.08(kT/q)(R_{46}/R_{44})+(kT/q)ln(I_2/8I_S) \qquad (14)$$

$$R_{46}=R_{44}(1.2-(kT/q)ln(I_2/8I_S))(q/2.08kT) \qquad (15)$$

$$R_{46}=R_{44}(1.2q/kT-ln(I_2/8I_S))/2.08 \qquad (16)$$

Accordingly, resistor 46 is selected in accordance with expression (16).

Further details regarding CMOS bandgap reference circuits are described by B. S. Song and P. R. Gray in "A Precision Curvature-Compensated CMOS Bandgap Reference," IEEE Journal of Solid-State Circuits, Vol. SC-18, No. 6, pp. 634–643, December 1983, which is incorporated herein by reference.

Operational amplifier 56 receives the reference voltage at a non-inverting input terminal and provides a buffered reference voltage at its output terminal at node 74. In addition, operational amplifier 56 has an inverting input terminal coupled to its output terminal. As a result, operational amplifier 56 is a unity-gain buffer, the buffered reference voltage has the same voltage as the reference voltage, namely 1.2V, and the buffered reference voltage is provided at a low impedance output.

Biasing circuit 18 generates a fourth current ($I_4$) that is essentially identical to the second current ($I_2$) in bandgap reference circuit 14 by way of the current mirror arrangement between transistors 36 and 60. Therefore, the fourth current is proportional to absolute temperature. Biasing circuit 18 develops the biasing voltage ($V_{BIAS}$) across resistor 62 at node 76. The biasing voltage is proportional to absolute temperature and linearly increases as temperature increases. This occurs not only because the fourth current through resistor 62 is proportional to absolute temperature, but also because resistor 62 has a positive temperature coefficient. Biasing circuit 18 is devoid of a diode-connected transistor which would otherwise introduce a negative temperature coefficient.

Figure 7:
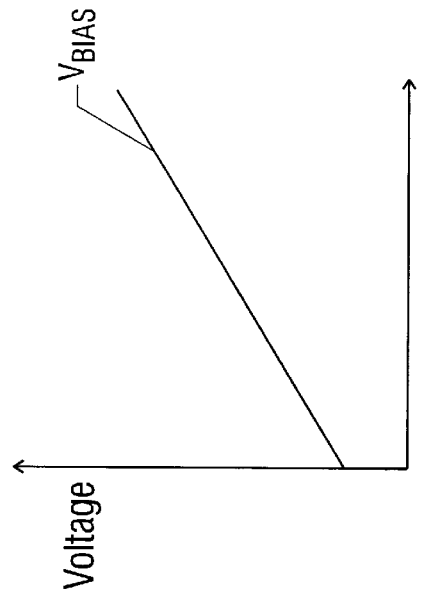

FIG. 7 is a graph of the biasing voltage at node 76 as a function of temperature.

Referring again to FIG. 1, operational amplifier 64 includes a non-inverting input terminal coupled to node 76 so that operational amplifier 64 receives the biasing voltage. Input resistor 66 is coupled between node 74 and the inverting input terminal of operational amplifier 64 so that operational amplifier 64 is responsive to the buffered reference voltage. Feedback resistor 68 is coupled between the inverting input terminal and the output terminal of operational amplifier 64. As a result, operational amplifier 64 amplifies the buffered reference voltage and the biasing voltage to provide the output voltage ($V_{OUT}$) at its output terminal at node 78. The output voltage linearly increases with increasing temperature. Furthermore, resistors 66 and 68 are set to suitable values so that the output voltage has a slope and offset that is indicative of temperature in the desired scale, such as degrees Celsius or Fahrenheit.

FIG. 8 is a graph of the output voltage at node 78 as a function of temperature. The output voltage, which is responsive to the buffered reference voltage and the biasing voltage, has a steeper slope than the biasing voltage, and is offset with respect to the biasing voltage except at a single temperature where they cross. For illustration purposes, the Celsius scale is used, and the output voltage has a magnitude of 500 mV at 0° C. that increases 10 mV/° C.

FIG. 8 can be better appreciated in conjunction with a more detailed explanation of the operation of amplifier 20. Referring again to FIG. 1, it is seen that the inverting terminal of operational amplifier 64 is coupled to resistors 66 and 68 at node 92. Thus, operational amplifier 64 amplifies the difference of the biasing voltage and the voltage at node 92 ($V_{92}$). The input impedance of operational amplifier 64 is sufficiently high that it can be approximated as an infinite impedance. Therefore, the currents through resistors 66 and 68 are essentially identical and can be related to one another by the expression $$(V_{BUFREF}-V_{92})/R_{66}=(V_{92}-V_{OUT})/R_{68} \qquad (17)$$

Solving for the voltage at node 92, $$V_{BUFREF}R_{68}V_{92}R_{68}=V_{92}R_{66}-V_{OUT}R_{66} \qquad (18)$$

$$V_{92}=(V_{BUFREF}R_{68}+V_{OUT}R_{66})/(R_{66}+R_{68}) \qquad (19)$$

The gain of operational amplifier 64 is sufficiently high that the difference between the biasing voltage and the voltage at node 92 is very small in comparison to the output voltage. Therefore, the biasing voltage and the voltage at node 92 can be approximated as being identical to one another, and in accordance with expression (19), the biasing voltage is given by the expression $$V_{BIAS}=(V_{BUFREF}R_{68}+V_{OUT}R_{66})/(R_{66}+R_{68}) \qquad (20)$$

Solving for the output voltage, $$V_{BIAS}(R_{66}+R_{68})=V_{BUFREF}R_{68}+V_{OUT}R_{66} \qquad (21)$$

$$V_{OUT}=V_{BIAS}(R_{66}+R_{68})/R_{66}-V_{BUFREF}(R_{68}/R_{66}) \qquad (22)$$

Figure 9:
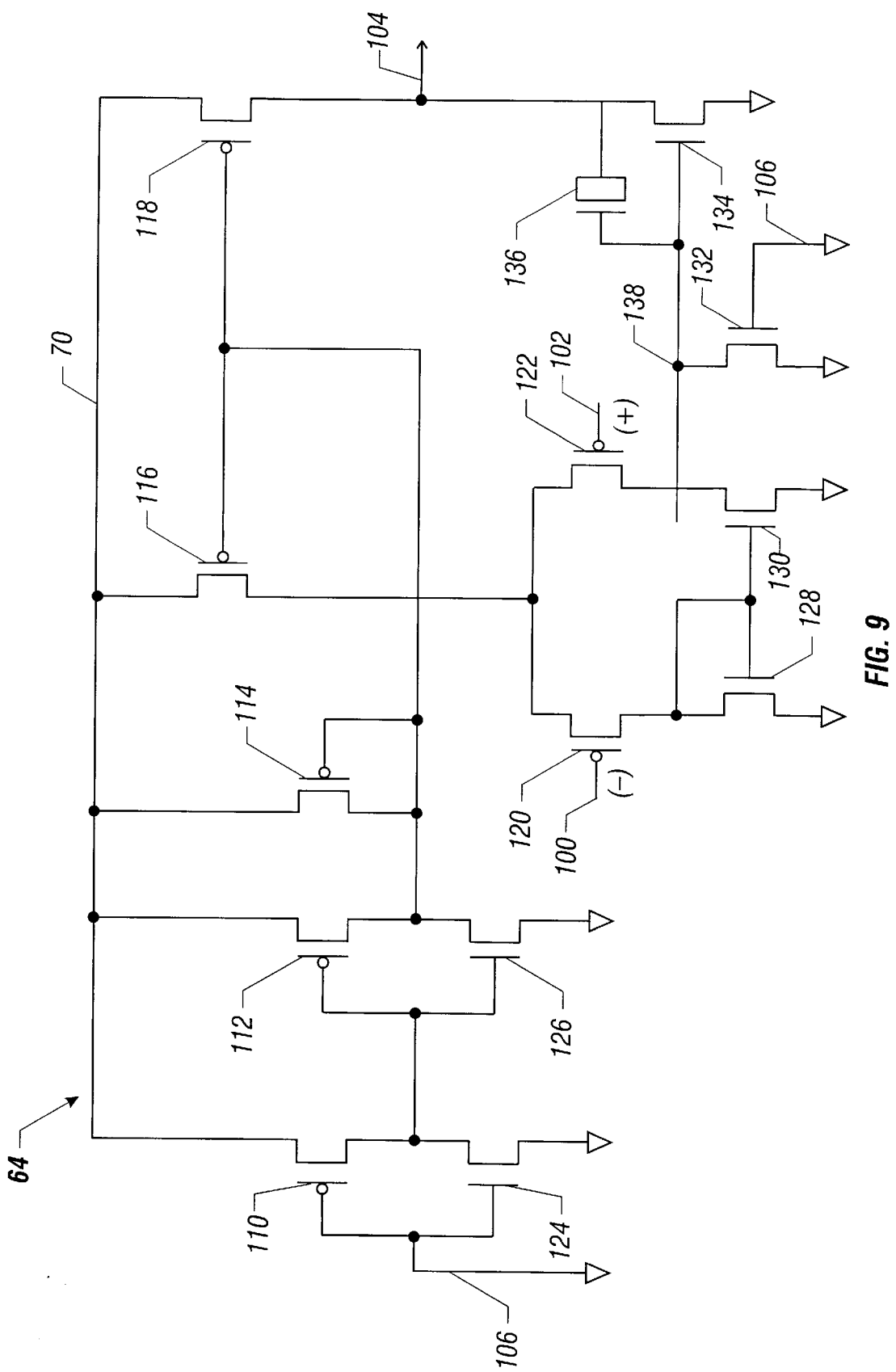
FIG. 9 is a circuit diagram of an operational amplifier in the temperature sensor of FIG. 1.

FIG. 9 is a circuit diagram for operational amplifier 64. Operational amplifier 64 includes inverting input terminal 100, non-inverting input terminal 102, output terminal 104, disable terminals 106, P-channel MOS field effect transistors 110, 112, 114, 116, 118, 120 and 122, N-channel MOS field effect transistors 124, 126, 128, 130, 132 and 134, and capacitor 136. The disable terminals are coupled to ground, thereby deactivating the disable function. The wells of the P-channel transistors are coupled to power supply terminal 70, and the wells of the N-channel transistors are coupled to ground.

For convenience of illustration, these connections are not shown.

Transistors 118 and 134 are relatively large since they drive the output signal. Although transistors 118 and 134 can each be fabricated with a single source, drain and channel region, it is preferred that transistor 118 include five parallel connected transistors and transistor 134 include ten parallel-connected transistors in order to provide better matching.

Figure 10:
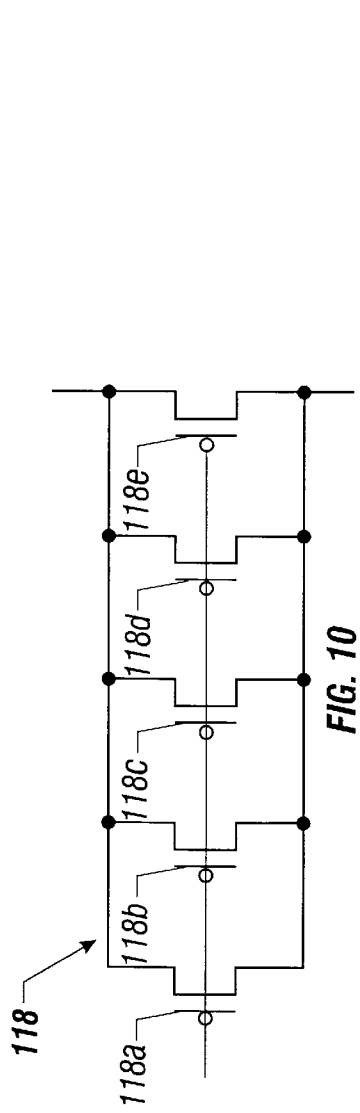
FIGS. 10 and 11 are circuit diagrams of field effect transistors in the operational amplifier of FIG. 9.
Figure 11:
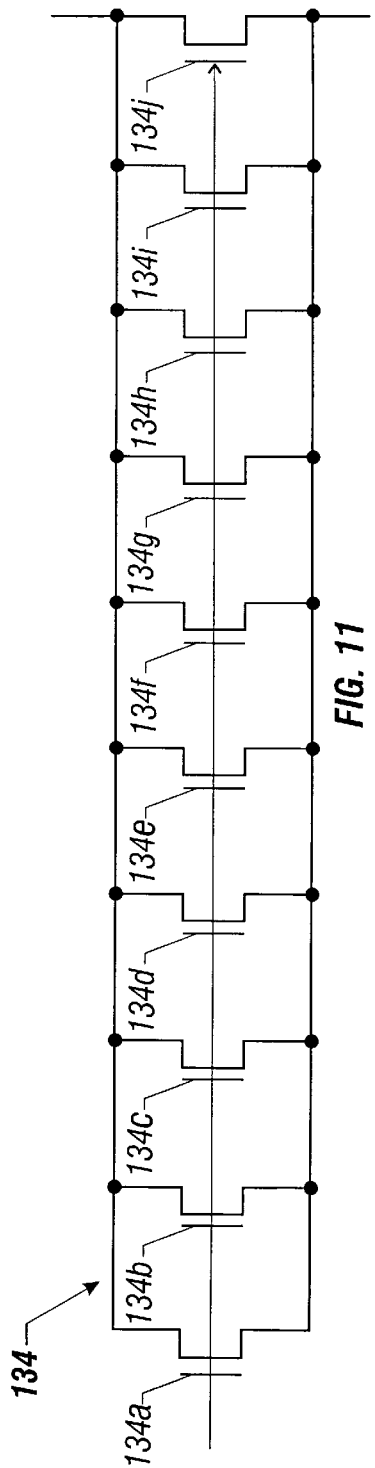

FIGS. 10 and 11 show circuit diagrams of transistors 118 and 134, respectively. As is seen, transistor 118 includes five parallel-connected transistors 118a, 118b, 118c, 118d and 118e, and transistor 134 includes ten parallel-connected transistor 134a, 134b, 134c, 134d, 134e, 134f, 134g, 134h, 134i and 134j.

Returning to FIG. 9, capacitor 136 is implemented by an N-channel MOS field effect transistor with the gate forming a first electrode and the source, drain and channel forming a second electrode.

Transistors 116, 120, 122, 128 and 130 provide a differential input stage which adjusts the voltage at node 138 to change the drive current of transistor 134. When the voltage at inverting input terminal 100 exceeds the voltage at non-inverting input terminal 102, the voltage at node 138 rises, transistor 134 sinks more current, and the voltage at output terminal 104 decreases. Likewise, when the voltage at non-inverting input terminal 102 exceeds the voltage at inverting input terminal 100, the voltage at node 138 falls, transistor 134 sinks less current and the voltage at output terminal 104 increases. Operational amplifier 64 has a voltage gain (at low frequencies, assuming no external feedback between the input and output terminals) on the order to 60 decibels. Further details regarding the operation of operational amplifier 64 are apparent to those skilled in the art.

Operational amplifier 56 is essentially identical to operational amplifier 64. Therefore, a separate circuit diagram for operational amplifier 56 is not shown.

Exemplary sizes for the transistors in temperature sensor 10 are listed below in table 1.

TABLE 1

| Transistor | Dimensions |
| --- | --- |
| 22 | 3 micron width, 10 micron length |
| 24 | 10 micron width, 3 micron length |
| 26 | 5 micron width, 2 micron length |
| 28 | 100 micron width, 2 micron length |
| 30 | 2 micron width, 2 micron length |
| 32 | 5 micron width, 2 micron length |
| 34 | 100 micron width, 3 micron length |
| 36 | 100 micron width, 3 micron length |
| 38 | 100 micron width, 3 micron length |
| 40 | 100 micron width, 3 micron length |
| 42 | 100 micron width, 3 micron length |
| 50 | 12 micron by 12 micron emitter area |
| 52a–52h | 12 micron by 12 micron emitter area |
| 54a–54h | 12 micron by 12 micron emitter area |
| 60 | 100 micron width, 3 micron length |
| 110 | 6 micron width, 3 micron length |
| 112 | 6 micron width, 3 micron length |
| 114 | 100 micron width, 1.2 micron length |
| 116 | 100 micron width, 1.2 micron length |
| 118a–118e | 100 micron width, 1.2 micron length |
| 120 | 50 micron width, 1.2 micron length |
| 122 | 50 micron width, 1.2 micron length |
| 124 | 6 micron width, 3 micron length |
| 126 | 6 micron width, 3 micron length |
| 128 | 50 micron width, 1.2 micron length |
| 130 | 50 micron width, 1.2 micron length |
| 132 | 10 micron width, 2 micron length |
| 134a–134j | 50 micron width, 1.2 micron length |

Although temperature sensor 10 can be simulated through modeling, the optimal values for the resistors may not be available through modeling alone. For instance, it may be difficult or impossible to accurately model the resistor values in order to calibrate the output voltage within a fraction of a degree. Furthermore, the modeling may not account for the temperature coefficients of the resistors. Therefore, as temperature sensor 10 is fabricated, it is highly desirable to adjust the values of at least some of the resistors in order to provide precise calibration and/or set the output voltage to the desired temperature scale. The preferred approach is to provide temperature sensor 10 with a plurality of integrated resistors (such as diffused resistors or well resistors) that can be selectively interconnected by programmable junctions (or switches) in the final metal layer on the chip. During wafer fabrication, the initial metal layers (such as metal-1 and metal-2) are usually the most difficult metal layers to fabricate. Accordingly, after a batch of wafers has been processed up to the final metal layer (such as metal-5 or metal-6), a few experimental wafers can be fabricated with the final metal layer and then rapidly tested to evaluate the performance of the temperature sensor. Once the optimal resistor values are determined, the final metal layer can be defined to selectively open and close the programmable junctions to provide the optimal resistor values, and the remaining wafers can be fabricated with highly accurate temperature sensors.

FIGS. 12, 13, 14 and 15 are top plan schematic views of resistors 44, 46, 62, and 66 and 68, respectively. The resistive blocks are composed of one or more diffused resistors. Each diffused resistor is doped P+ in an N-well, has a width of 5 microns, and a length of 4 microns. Since the sheet resistance of the P+ regions is 90 Ω/sq, each diffused resistor has a resistance of 72 ohms (although this resistance is temperature dependent). The diffused resistors are doped during a boron implant step that forms heavily doped source and drain regions for the P-channel transistors. The blocks labeled "1x" represent a single diffused resistor, the blocks labeled "2x" represent two series-connected diffused resistors (with a combined resistance of 144 ohms), the blocks labeled "4x" represent four series-connected diffused resistors (with a combined resistance of 288 ohms), etc. In some instances, additional resistors are schematically shown. The additional resistors are similar to the diffused resistors but smaller.

Figure 12:
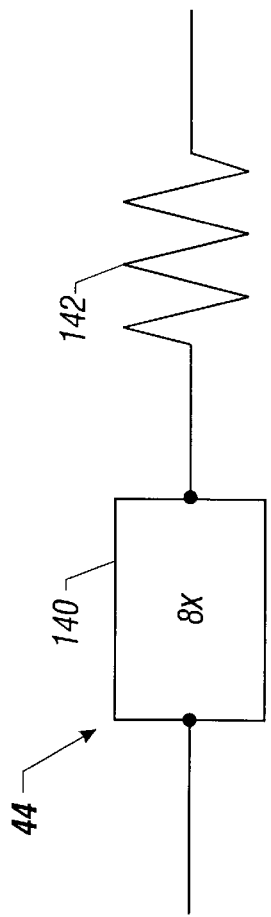
FIGS. 12, 13, 14 and 15 are top plan schematic views of resistors in the temperature sensor of FIG. 1.
Figure 13:
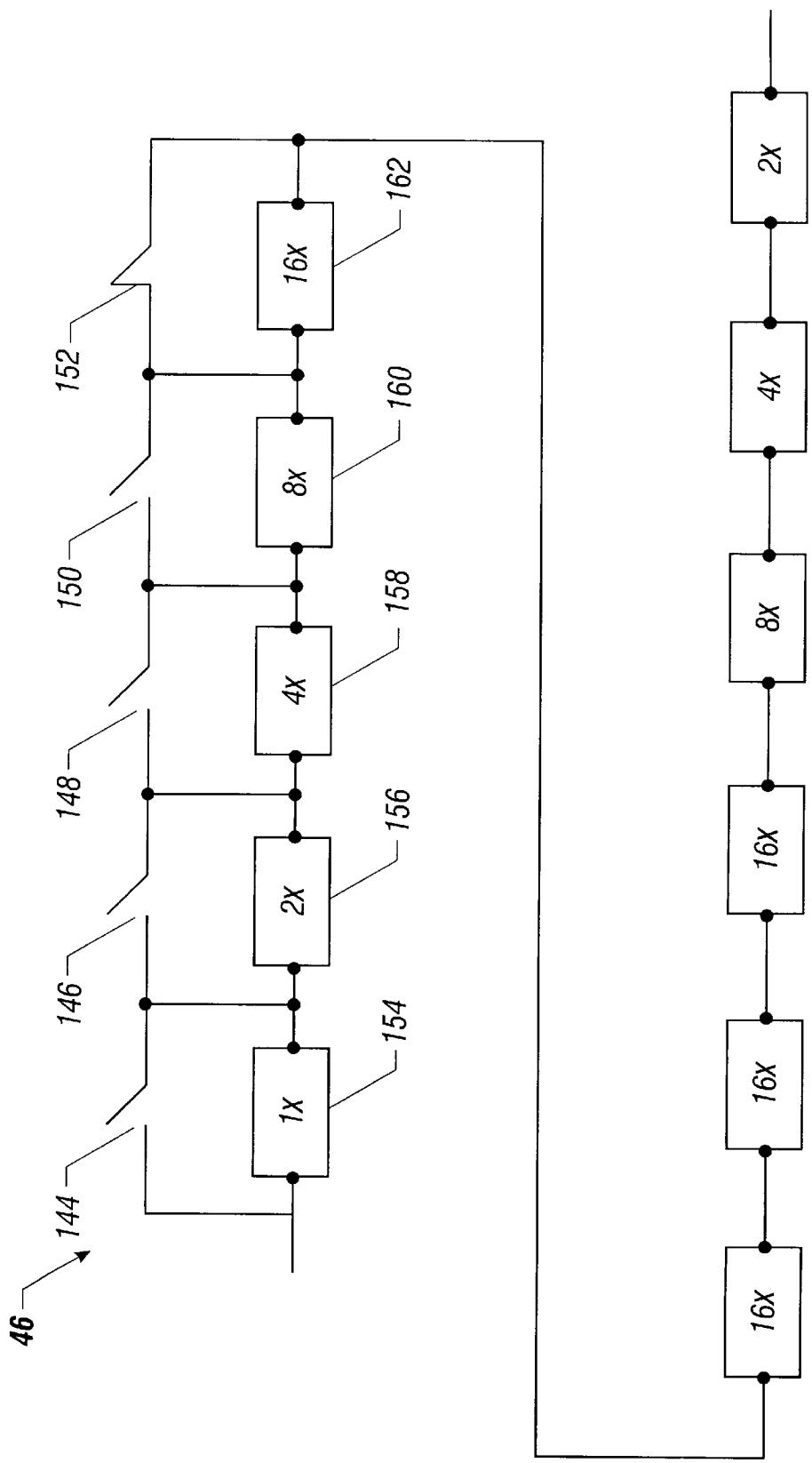

With reference to FIG. 12, resistor 44 is a non-programmable resistor provided by the series connection of resistive block 140 and resistor 142. Resistor 142 has a resistance of 23 ohms. Since resistive block 140 has a resistance of 576 ohms, resistor 44 has a resistance of about 600 ohms. With reference to FIG. 13, resistor 46 includes programmable junctions 144, 146, 148, 150 and 152 for resistive blocks 154, 156, 158, 160 and 162, respectively. Shorting the programmable junctions (or closing the switches) routes the current around the respective resistive blocks, thereby bypassing them, whereas opening the programmable junctions forces the current through the respective resistive blocks. For illustration purposes, programmable junctions 144, 146, 148 and 150 are opened, and programmable junction 152 is closed. As a result, resistive blocks 154, 156, 158 and 160 are programmably selected for resistor 46, and resistive block 162 is programmably removed from resistor 46. Thus, resistive blocks 154, 156, 158 and 160 add a combined resistance of 15×72 ohms, or 1028 ohms to resistor 46, and resistive block 162 adds no resistance to resistor 46.

Figure 14:
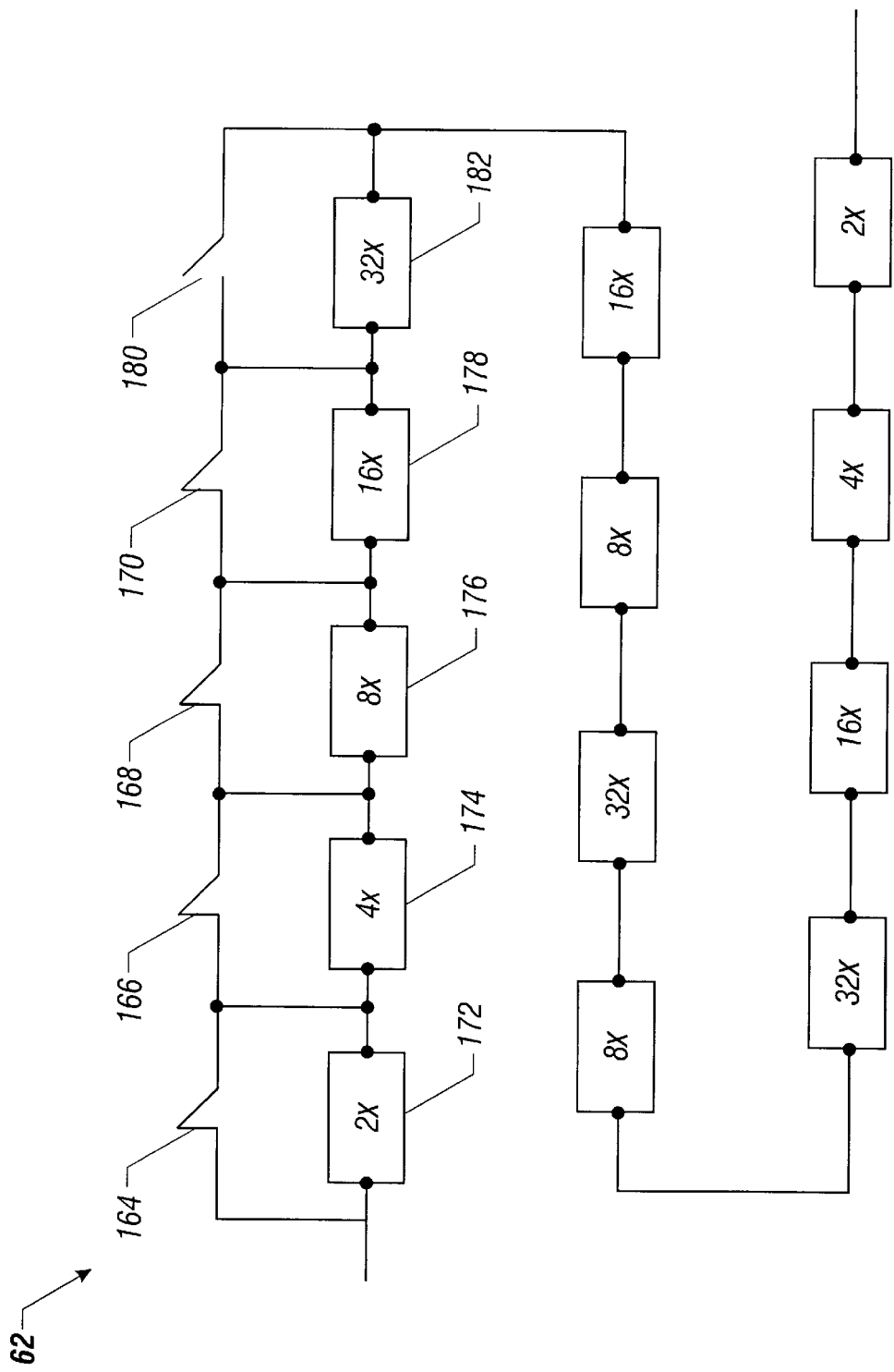

With reference to FIG. 14, programmable junctions 164, 166, 168 and 170 programmably remove resistive blocks 172, 174, 176 and 178, respectively, from resistor 62, and programmable junction 180 programmably selects resistive block 182 for resistor 46.

Figure 15:
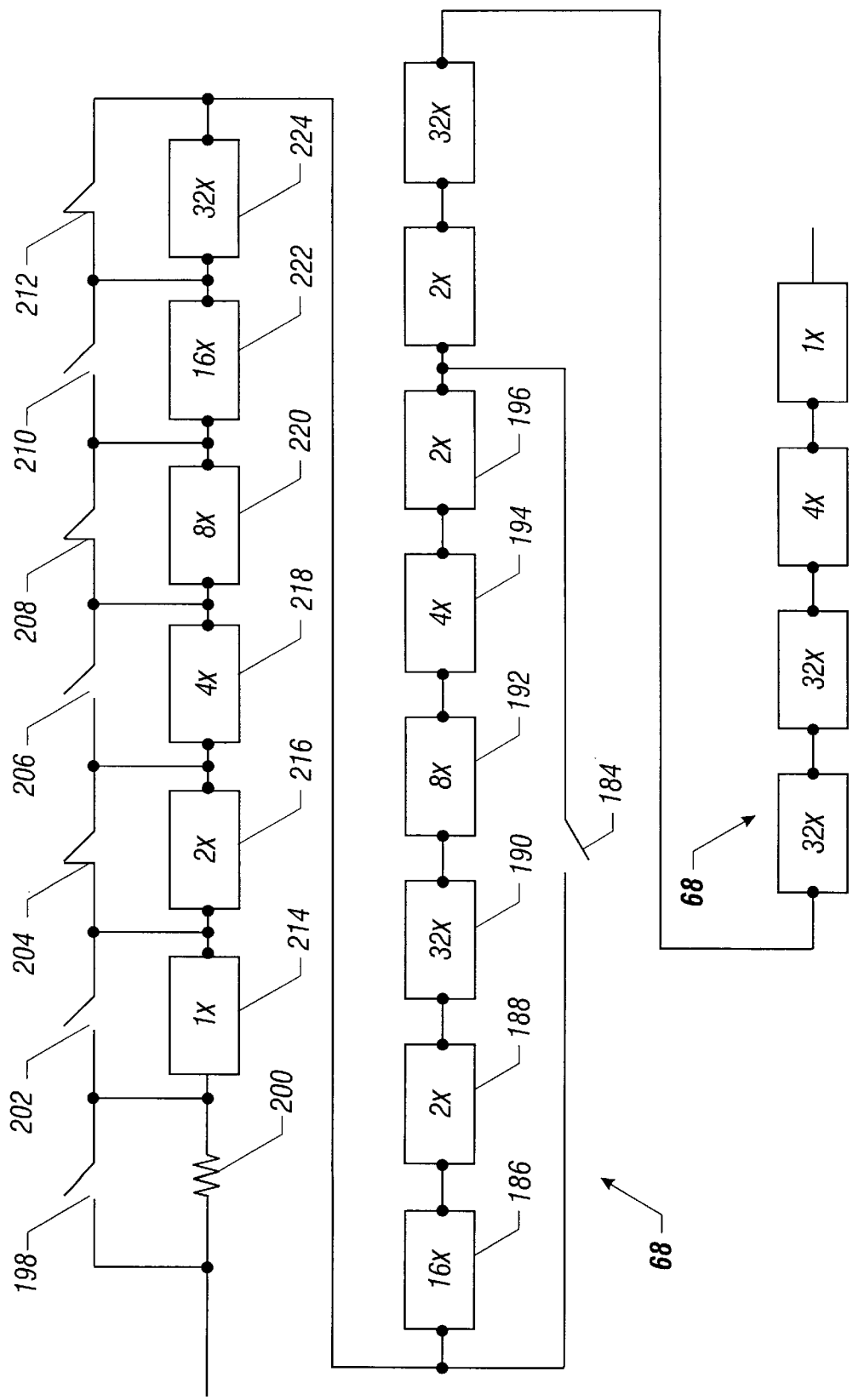

With reference to FIG. 15, resistor 66 is a programmable resistor, but resistor 68 is not. Programmable junction 184 is opened and therefore programmably selects resistive blocks 186, 188, 190, 192, 194 and 196 for resistor 66. Programmable junction 198 is opened and selects additional resistor 200, which is one-half the size of a 1x resistive block and has a resistance of 36 ohms, for resistor 66. Likewise, programmable junctions 202, 206 and 210 are opened, and programmable junctions 204, 208, and 212 are closed, thereby selecting resistive blocks 214, 218 and 222 for resistor 66, and deselecting resistive blocks 216, 220 and 224 from resistor 66.

From inspection of FIG. 15, it is seen that resistor 66 has a resistance of 69×72 ohms, or 4968 ohms, and resistor 68 has a resistance of (119×72)+36 ohms, 8604 ohms. Therefore, since the buffered reference voltage is 1.2V, in accordance with expression (22), $$V_{OUT}=V_{BIAS}(8604+4968)/8604-1.2(4968/8604) \quad (23)$$

$$V_{OUT}=1.577V_{BIAS}-0.6929 \quad (24)$$

Figure 16:
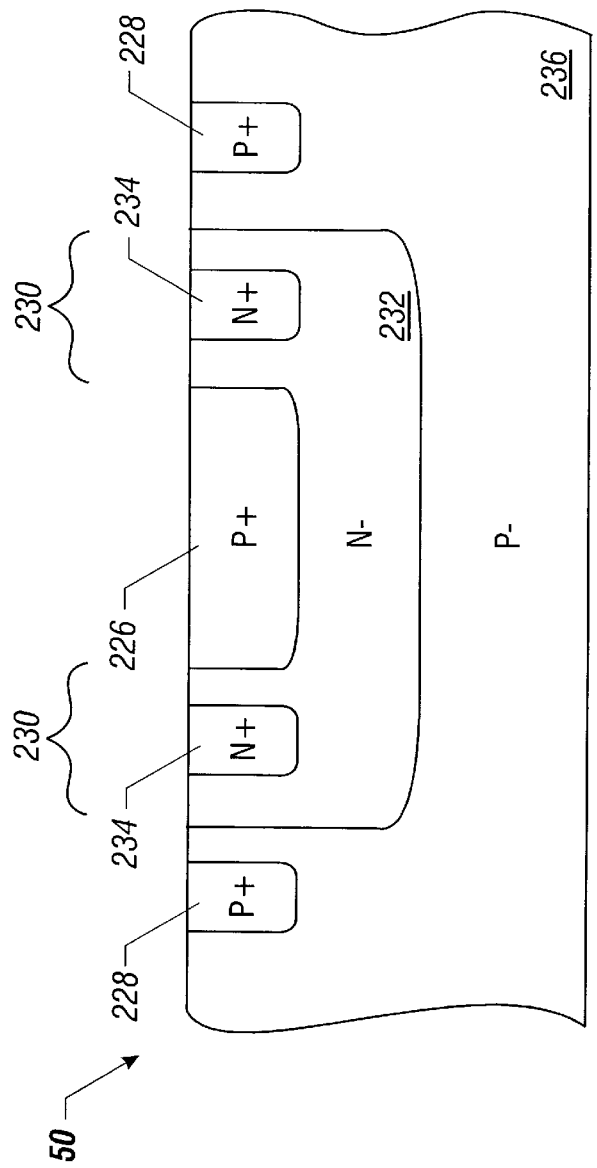
FIG. 16 is a cross-sectional view of a bipolar transistor in the temperature sensor of FIG. 1.

Referring again to FIG. 8, since the output voltage has a magnitude of 500 mV at 0° C., in accordance with expression (24), the biasing voltage has a magnitude of 756 mV at 0° C. Furthermore, in accordance with expression (24), the output voltage and the biasing voltage cross one another at about 1.2V, which is the buffered reference voltage. Thus, the output voltage is negatively offset with respect to the biasing voltage when the output voltage is less than 1.2V, and the output voltage is positively offset with respect to the biasing voltage when the output voltage is greater than 1.2V FIG. 16 is a cross-sectional view of bipolar transistor 50. Bipolar transistor 50 includes P+ emitter 226, P+ collector 228, and base 230 that includes N− base region 232 and N+ base region 234. Bipolar transistor 50 is formed in P− epitaxial surface layer 236 over a P+ layer (not shown). Base region 234 is a ring within base region 232 that is displaced from and surrounds emitter 226, and collector 228 is a ring within epitaxial surface layer 236 that is displaced from and surrounds base region 232. Base region 232 is doped during a phosphorus implant step that forms N-wells for the P-channel transistors, base region 234 is formed during an arsenic implant that forms heavily doped source and drain regions for the N-channel transistors, and emitter 226 and collector 228 are doped during a boron implant step that forms heavily doped source and drain regions for the P-channel transistors. Of importance, even though transistor 50 is a bipolar transistor, it is fabricated using a purely CMOS process. The other bipolar transistors in temperature sensor 10 are fabricated in the same manner.

Figure 17:
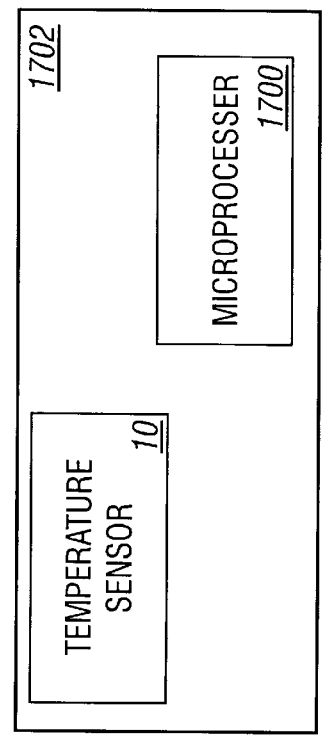
FIG. 17 shows a temperature sensor and a microprocessor embedded in a single integrated circuit chip.

Preferably, as shown in FIG. 17 temperature sensor 10 and a microprocessor 1700 are embedded in a single integrated circuit chip 1702 implemented in CMOS technology. In this manner, temperature sensor 10 and the microprocessor share the same semiconducting substrate and are integral with one another. As a result, the temperature sensor 10 senses a temperature that is highly correlated with and essentially identical to the microprocessor temperature.

Providing temperature sensor 10 integral with a microprocessor confers many system advantages. For instance, when the output signal of the temperature sensor indicates that the operating temperature of the microprocessor exceeds a predetermined temperature, then a warning signal can be issued to a user, such as by visually displaying a warning message on a monitor. The warning message can inform the user that the microprocessor (or related computer system) will automatically shut down after a certain time interval, or alternatively, the warning message can notify the user that overheating has occurred and let the user decide what to do.

As another example, when the output signal of the temperature sensor indicates that the operating temperature of the microprocessor exceeds a predetermined temperature, then a command can be issued to a clock generator to slow down the clock speed of the microprocessor, thereby cooling down the microprocessor while it continues to operate. This can be particularly useful if the microprocessor overheats as it operates near or above its maximum operating speed.

As yet another example, when the output signal of the temperature sensor indicates that the operating temperature of the microprocessor exceeds a predetermined temperature, then a control signal can be sent to a cooling system to provide additional cooling for the microprocessor.

As a further example, the output signal of the temperature sensor can indicate the operating temperature of the microprocessor, and temperature-indicating data based on the output signal of the temperature sensor can be stored in non-volatile memory of the microprocessor. For instance, the temperature-indicating data can provide a thermal history of the microprocessor for all times that the microprocessor has operated. Alternatively, the temperature-indicating data can indicate merely the times that the operating temperature of the microprocessor has exceeded a predetermined temperature. In either case, it may be desirable to store the temperature-indicating data in semi-permanent non-volatile memory of the microprocessor which can not be erased or altered by the user. Suppose, for instance, that a microprocessor fails to operate properly, the microprocessor is under warranty, and the user requests a new microprocessor or a refund. In this instance, temperature-indicating data stored in non-volatile memory of the microprocessor that can not be altered by the user but is accessible by the manufacturer can be extremely useful to the manufacturer. The temperature-indicating data can assist the manufacturer with determining whether the user has operated the microprocessor outside the maximum rated temperature which might violate the conditions of the warranty.

Suitable circuitry such as an analog-to-digital converter can convert the analog output voltage of temperature sensor 10 into a digital signal representing the temperature of the microprocessor. For instance, temperature-indicating data stored in non-volatile memory of the microprocessor would be in digital form.

Other variations and modifications of the embodiments disclosed herein may be made based on the description set forth herein without departing from the scope and spirit of the invention as set forth in the following claims.

What is claimed is:

1. A temperature sensor, comprising:
   a bandgap reference circuit for providing a temperature-independent reference voltage;
   a biasing circuit that mirrors a current in the bandgap reference circuit for providing a temperature-dependent biasing voltage; and
   an amplifier responsive to the reference voltage and the biasing voltage for providing a temperature-dependent output voltage.

2. The temperature sensor of claim 1, wherein:
   the bandgap reference circuit includes first, second and third current paths between a power supply terminal and ground;
   the first current path includes a field effect transistor with an input terminal coupled to a node and an output terminal coupled to the power supply terminal, a diode-connected bipolar transistor with a control terminal and output terminal coupled to ground, and is devoid of a resistor;
   the second current path includes a field effect transistor with an input terminal coupled to the node and an output terminal coupled to the power supply terminal, a diode-connected bipolar transistor with a control terminal and output terminal coupled to ground, and a resistor coupled to another output terminal of the diode-connected bipolar transistor in the second current path; and the third current path includes a field effect transistor with an input terminal coupled to the node and an output terminal coupled to the power supply terminal, a diode-connected bipolar transistor with a control terminal and output terminal coupled to ground, and a resistor coupled to another output terminal of the diode-connected bipolar transistor in the third current path.

3. The temperature sensor of claim 2, wherein:

a base-emitter voltage of the diode-connected bipolar transistor in the first current path provides a first voltage that decreases as temperature increases;

a base-emitter voltage of the diode-connected bipolar transistor in the second current path and a voltage across the resistor in the second current path in combination provide a second voltage that is essentially identical to the first voltage; and a base-emitter voltage of the diode-connected bipolar transistor in the third current path and a voltage across the resistor in the third current path in combination provide the reference voltage.

4. The temperature sensor of claim 3, wherein the biasing circuit includes a current path between the power supply terminal and ground that includes a field effect transistor with a control terminal coupled to the node and an output terminal coupled to the power supply terminal, a resistor coupled to ground, and is devoid of a diode-connected bipolar transistor.

5. The temperature sensor of claim 4, wherein a voltage across the resistor in the biasing circuit provides the biasing voltage.

6. The temperature sensor of claim 5, wherein the amplifier includes inverting and non-inverting input terminals and an output terminal, a feedback resistor is coupled between the inverting terminal and the output terminal, and the non-inverting terminal is coupled to the field effect channel transistor and the resistor in the biasing circuit.

7. The temperature sensor of claim 6, further including a unity-gain buffer and an input resistor, wherein:

the unity-gain buffer includes an input terminal coupled to the field effect transistor and the resistor in the third current path; and the input resistor is coupled between an output terminal of the unity-gain buffer and the inverting input terminal of the amplifier.

8. The temperature sensor of claim 1, wherein the output voltage is proportional to absolute temperature.

9. The temperature sensor of claim 1, implemented in CMOS technology.

10. A single integrated circuit chip including the temperature sensor of claim 1 and a microprocessor.

11. A temperature sensor, comprising:

a bandgap reference circuit for providing a temperature-independent reference voltage;

a biasing circuit that mirrors a current in the bandgap reference circuit for providing a temperature-dependent biasing voltage that is proportional to absolute temperature;

a first operational amplifier responsive to the reference voltage for providing a temperature-independent buffered reference voltage; and an amplifier responsive to the buffered reference voltage and the biasing voltage for providing a temperature-dependent output voltage that is proportional to absolute temperature.

12. The temperature sensor of claim 11, wherein:

the bandgap reference circuit includes first, second and third current paths between a power supply terminal and ground;

the first current path includes a P-channel transistor with a gate coupled to a node and a source coupled to the power supply terminal, a diode-connected PNP transistor with a base and collector coupled to ground, and is devoid of a resistor;

the second current path includes a P-channel transistor with a gate coupled to the node and a source coupled to the power supply terminal, a diode-connected PNP transistor with a base and collector coupled to ground, and a resistor coupled to an emitter of the diode-connected PNP transistor in the second current path; and the third current path includes a P-channel transistor with a gate coupled to the node and a source coupled to the power supply terminal, a diode-connected PNP transistor with a base and collector coupled to ground, and a resistor coupled to an emitter of the diode-connected PNP transistor in the third current path.

13. The temperature sensor of claim 12, wherein:

a base-emitter voltage of the diode-connected PNP transistor in the first current path provides a first voltage that decreases as temperature increases;

a base-emitter voltage of the diode-connected PNP transistor in the second current path and a voltage across the resistor in the second current path in combination provide a second voltage that is essentially identical to the first voltage; and a base-emitter voltage of the diode-connected PNP transistor in the third current path and a voltage across the resistor in the third current path in combination provide the reference voltage.

14. The temperature sensor of claim 13, wherein the biasing circuit includes a current path between the power supply terminal and ground that includes a P-channel transistor with a gate coupled to the node and a source coupled to the power supply terminal, a resistor coupled to ground, and is devoid of a diode-connected PNP transistor.

15. The temperature sensor of claim 14, wherein a voltage across the resistor in the biasing circuit provides the biasing voltage.

16. The temperature sensor of claim 15, wherein the first amplifier includes first inverting and non-inverting input terminals and a first output terminal, the first inverting and output terminals are coupled to one another, and the first non-inverting input terminal is coupled to the P-channel transistor and the resistor in the third current path.

17. The temperature sensor of claim 16, wherein the second amplifier includes second inverting and non-inverting input terminals and a second output terminal, a feedback resistor is coupled between the second inverting and output terminals, the second non-inverting terminal is coupled to the P-channel transistor and the resistor in the biasing circuit, and an input resistor is coupled between the second inverting terminal and the first output terminal.

18. The temperature sensor of claim 11, wherein currents through the first, second and third current paths in the bandgap reference circuit and the current path in the biasing circuit are proportional to absolute temperature.

19. The temperature sensor of claim 11, implemented in CMOS technology.

20. A single integrated circuit chip including the temperature sensor of claim 11 and a microprocessor.

21. A temperature sensor, comprising:

a bandgap reference circuit, including:

first, second and third field effect transistors with control terminals coupled to a first node and output terminals coupled to a first power supply terminal, wherein the second field effect transistor includes another output terminal coupled to the first node;

fourth and fifth field effect transistors with control terminals coupled to a second node, wherein the fourth field effect transistor includes an output terminal coupled to the second node;

first, second and third diode-connected bipolar transistors with control terminals and output terminals coupled to a second power supply terminal; and first and second resistors, wherein the first resistor is coupled between output terminals of the fifth field effect transistor and the second diode-connected bipolar transistor, and the second resistor is coupled between output terminals of the third field effect transistor and the third diode-connected bipolar transistor; wherein a first current path between the first and second power supply terminals includes the first and fourth field effect transistors and the first diode-connected bipolar transistor;

a second current path between the first and second power supply terminals includes the second and fifth field effect transistors and the first resistor and the second diode-connected bipolar transistor;

a third current path between the first and second power supply terminals includes the third field effect transistor and the second resistor and the third diode-connected bipolar transistor; and a temperature-independent reference voltage is provided at a third node in the third current path between the third field effect transistor and the second resistor;

a biasing circuit, including:
a sixth field effect transistor with a control terminal coupled to the first node and an output terminal coupled to the first power supply terminal; and
a third resistor coupled between another output terminal of the sixth field effect transistor and the second power supply terminal; wherein
a fourth current path between the first and second power supply terminals includes the sixth field effect transistor and the third resistor; and
a temperature-dependent biasing voltage is provided at a fourth node in the fourth current path between the sixth field effect transistor and the third resistor;

a buffering stage with an input terminal coupled to the third node and an output terminal coupled to a fifth node;

an amplifying stage, including:
an operational amplifier with a non-inverting input terminal coupled to the fourth node, an inverting input terminal, and an output terminal;
a fourth resistor coupled to the inverting input terminal and the fifth node; and
a fifth resistor coupled to the inverting input terminal and the output terminal of the operational amplifier; wherein
a temperature-dependent output voltage is provided at the output terminal of the operational amplifier.

22. The temperature sensor of claim 21, wherein:
the first, second, third and sixth field effect transistors are P-channel transistors;
the fourth and fifth field effect transistors are N-channel transistors; and
the first, second and third diode-connected bipolar transistors are PNP transistors.

23. The temperature sensor of claim 21, wherein at least one of the second and third resistors, and at least one of the fourth and fifth resistors, include a plurality of programmably interconnected diffused resistors.

24. The temperature sensor of claim 21, wherein the first diode-connected bipolar transistor consists of a single bipolar transistor, and the second and third diode-connected bipolar transistors each include a plurality parallel-connected bipolar transistors.

25. The temperature sensor of claim 21, wherein currents through the first, second, third and fourth current paths are proportional to absolute temperature.

26. A temperature sensor, comprising:
a bandgap reference circuit, including:
first, second and third P-channel transistors with gates coupled to a first node and sources coupled to a power supply terminal, wherein the second P-channel transistor includes a drain coupled to the first node;
first and second N-channel transistors with gates coupled to a second node, wherein the first N-channel transistor includes a drain coupled to the second node;
first, second and third diode-connected PNP transistors with bases and collectors coupled to ground; and
first and second resistors, wherein the first resistor is between a source of the second N-channel transistor and an emitter of the second PNP transistor, and the second resistor is between a source of the third P-channel transistor and an emitter of the third PNP transistor; wherein
a first current path between the power supply terminal and ground includes the first P-channel transistor and the first N-channel transistor and the first PNP transistor;
a second current path between the power supply terminal and ground includes the second P-channel transistor and the second N-channel transistor and the first resistor and the second PNP transistor;
a third current path between the power supply terminal and ground includes the third P-channel transistor and the second resistor and the third PNP transistor; and
a temperature-independent reference voltage is provided at a third node in the third current path between the third P-channel transistor and the second resistor;

a biasing circuit, including:
a fourth P-channel transistor with a gate coupled to the first node and a source coupled to the power supply terminal; and
a third resistor coupled between a drain of the fourth P-channel transistor and ground; wherein
a fourth current path between the power supply terminal and ground includes the fourth P-channel transistor and the third resistor; and
a temperature-dependent biasing voltage is provided at a fourth node in the fourth current path between the fourth P-channel transistor and the third resistor;

a first operational amplifier with a non-inverting input terminal coupled to the third node; and a second operational amplifier with a non-inverting input terminal coupled to the fourth node, wherein a fourth resistor is coupled between an inverting input terminal and an output terminal of the second operational amplifier, a fifth resistor is coupled between an output terminal of the first operational amplifier and the inverting input terminal of the second operational amplifier, and the output terminal of the second operational amplifier provides a temperature-dependent output voltage.

27. The temperature sensor of claim 26, wherein:

a drain of the first P-channel transistor is coupled to the second node;

a drain of the second N-channel transistor is coupled to the first node;

a source of the first N-channel transistor is coupled to an emitter of the first PNP transistor;

the first resistor is coupled to a source of the second N-channel transistor and an emitter of the second PNP transistor;

the second resistor is coupled to a source of the third P-channel transistor and an emitter of the third PNP transistor; and the third resistor is coupled to a drain of the fourth P-channel transistor and ground.

28. The temperature sensor of claim 27, wherein:

at least one of the second and third resistors, and at least one of the fourth and fifth resistors, include a plurality of programmably interconnected diffused resistors;

the first PNP transistor consists of a single PNP transistor;

the second PNP transistor is a compound transistor that includes a plurality parallel-connected PNP transistors; and the third PNP transistor is a compound transistor that includes a plurality of parallel-connected PNP transistors.

29. The temperature sensor of claim 27, wherein currents through the first, second, third and fourth current paths are proportional to absolute temperature.

30. A temperature sensor integral with a microprocessor in a single integrated circuit chip, wherein the temperature sensor comprises:

a bandgap reference circuit for providing a temperature-independent reference voltage, a biasing circuit that mirrors a current in the bandgap reference circuit for providing a temperature-dependent biasing voltage, and an amplifier responsive to the reference voltage and the biasing voltage for providing an output signal.

31. A method of sensing temperature, comprising:

providing a temperature-independent reference voltage using a bandgap reference circuit;

providing a temperature-dependent biasing voltage using a biasing circuit that mirrors a current in the bandgap reference circuit; and providing a temperature-dependent output voltage using an amplifier responsive to the reference voltage and the biasing voltage.

32. The method of claim 31, including:

providing the current through the bandgap reference circuit that is proportional to absolute temperature; and providing a mirror current through the biasing circuit that mirrors the current through the bandgap reference circuit and is proportional to absolute temperature.

33. The method of claim 31, including:

providing the reference voltage across a series combination of a resistor and a diode-connected bipolar transistor in the bandgap reference circuit; and providing the biasing voltage across a resistor in the biasing circuit.

34. The method of claim 31, performed by a temperature sensor implemented in CMOS technology.

35. The method of claim 31, performed by a temperature sensor integral with and sensing the temperature of a microprocessor.

36. A method of using a temperature sensor integral with a microprocessor, comprising:

operating the microprocessor at an operating temperature;

using the temperature sensor to generate a temperature-dependent output signal indicative of the operating temperature, where the temperature sensor includes a bandgap reference circuit for providing a temperature-independent reference voltage, a biasing circuit that mirrors a current in the bandgap reference circuit for providing a temperature-dependent biasing voltage, and an amplifier responsive to the reference voltage and the biasing voltage for providing the output signal; and issuing a warning signal to a user in response to the output signal indicating that the operating temperature exceeds a predetermined temperature.

37. The method of claim 36, wherein the warning signal is a warning message visually displayed on a monitor.

38. The method of claim 36, wherein the microprocessor and the temperature sensor are embedded in a single integrated circuit chip.

39. The method of claim 38, wherein the output signal is proportional to absolute temperature.

40. The method of claim 39, wherein the temperature sensor is implemented in CMOS technology.

41. A method of using a temperature sensor integral with a microprocessor, comprising:

operating the microprocessor at an operating temperature;

using the temperature sensor to generate a temperature-dependent output signal indicative of the operating temperature; and reducing a clock speed of the microprocessor in response to the output signal indicating that the operating temperature exceeds a predetermined temperature.

42. The method of claim 41, wherein reducing the clock speed of the microprocessor cools down the microprocessor while the microprocessor continues to operate.

43. The method of claim 41, wherein the microprocessor and the temperature sensor are embedded in a single integrated circuit chip.

44. The method of claim 43, wherein the output signal is proportional to absolute temperature.

45. The method of claim 44, wherein the temperature sensor is implemented in CMOS technology.

46. The method of claim 44, wherein the temperature sensor includes:

a bandgap reference circuit for providing a temperature-independent reference voltage;

a biasing circuit that mirrors a current in the bandgap reference circuit for providing a temperature-dependent biasing voltage; and an amplifier responsive to the reference voltage and the biasing voltage for providing the output signal.

47. A method of using a temperature sensor integral with a microprocessor, comprising:

operating the microprocessor at an operating temperature;

using the temperature sensor to generate a temperature-dependent output signal indicative of the operating temperature, where the temperature sensor includes a bandgap reference circuit for providing a temperature-independent reference voltage, a biasing circuit that mirrors a current in the bandgap reference circuit for providing a temperature-dependent biasing voltage, and an amplifier responsive to the reference voltage and the biasing voltage for providing the output signal;

providing digital temperature-indicating data in response to the output signal; and storing the temperature-indicating data in non-volatile memory of the microprocessor.

48. The method of claim 47, wherein the temperature-indicating data stored in the non-volatile memory provides a thermal history of the microprocessor.

49. The method of claim 47, wherein the temperature-indicating data stored in the non-volatile memory can not be altered by a user.

50. The method of claim 47, wherein the microprocessor and the temperature sensor are embedded in a single integrated circuit chip.

51. The method of claim 50, wherein the output signal is proportional to absolute temperature.

52. The method of claim 51, wherein the temperature sensor is implemented in CMOS technology.

* * * * *